July 29, 1958
E. M. SMITH
2,845,580
ELECTRIC PROTECTIVE EQUIPMENT
Filed April 30, 1954
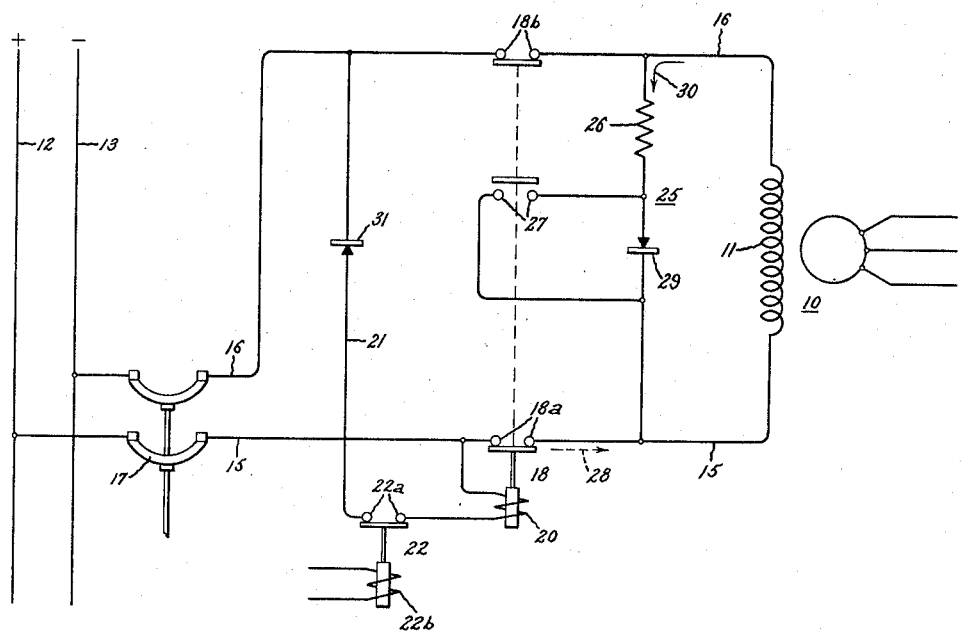
Inventor:
Eugene M. Smith,
by  J. Wesley Hauber
His Attorney.

United States Patent Office 2,845,580
Patented July 29, 1958

2,845,580

ELECTRIC PROTECTIVE EQUIPMENT

Eugene M. Smith, Drexel Hill, Pa., assignor to General Electric Company, a corporation of New York Application April 30, 1954, Serial No. 426,684

6 Claims. (Cl. 317—11)

This invention relates to electric protective equipment and, more particularly, to discharge means for dissipating the energy stored within an inductive device upon disconnection of the device from its source of excitation.

In certain electrical apparatus, such as, for example, synchronous motors and generators, it is customary to provide a highly inductive winding which is excited from a direct current source during normal operation of the apparatus. To safeguard the insulation of such a winding from the high voltages which are built up therein upon disconnection of the winding from its excitation source, it is customary to provide the winding with a discharge circuit including a discharge resistor. Ideally, this discharge circuit is maintained inoperative during normal excitation but is rendered operative just prior to disconnection of the winding from its source, whereby at the instant of disconnection, the winding may discharge through the resistor. To provide for this desired operation, it has been customary to control the discharge circuit by means of a field switch having interrupting contacts and discharge contacts arranged in overlapping relationship. Normally, with such a field switch, the discharge contacts, which render the discharge circuit operative, are moved into closed position just prior to the instant that the interrupting contacts are opened to disconnect the winding from its excitation source.

So long as the field switch alone is relied upon for disconnecting the winding from its source, this basic arrangement satisfactorily provides for effective discharge of the winding. In certain applications, however, the winding may be disconnected from its source of excitation by means other than the field switch. For example, a circuit breaker provided between the source of excitation and the winding may be opened before the field switch can operate to close its discharge contacts. Under such conditions a dangerously high voltage will be built up within the winding before the discharge contacts close. It is this problem with which the present invention is concerned.

Accordingly, where a disconnect switch is provided for controlling a discharge circuit for an inductive circuit element, it is an object of my invention to construct the discharge circuit in such a manner that it operates properly irrespective of whether the inductive element is disconnected from its excitation source by the disconnect switch or by some other disconnecting means.

It is a further object of my invention to construct the discharge circuit in such a manner that a switch having interrupting and discharge circuit control contacts need not be arranged with such contacts operable in overlapping relationship. By attaining this object, I have obviated the need for the fine adjustments and complex mechanisms which have generally been required in order to provide and maintain an overlapping relationship of the contacts. Also, such non-overlapping contacts permit the omission of the discharge resistor. As a result, where desired, the field winding may be short circuited completely upon disconnection of the winding from its excitation source.

Another object is to provide a discharge circuit which, when utilized for a synchronous motor field winding, is capable of performing the above functions but yet does not interfere with the normal starting operation for such a motor.

An additional object is to provide a discharge circuit for an inductive electric circuit element which is capable of performing all of the above-described operations but yet is of a simple and inexpensive construction.

In accordance with one form of my invention a discharge circuit is provided for an inductive circuit element which is connected for excitation from a source of unidirectional current. A switch having discharge contacts closable in response to disconnection of the inductive element from its excitation source is arranged to connect the discharge circuit across said inductive element whereby to permit the element to discharge in a predetermined direction through the circuit. A unidirectional conducting device, such as a rectifier, is connected in said discharge circuit and in shunt with the discharge contacts. Since this device is arranged with its direction of conductivity the same as said predetermined direction of discharge current flow through said circuit, the disconnected inductive element is free to discharge through said circuit even though the discharge contacts delay in closing until after the inductive element is disconnected from its source.

For a better understanding of the nature and objects of my invention, reference should be had to the following detailed description, taken in conjunction with the accompanying drawing, in which the single figure is a diagrammatic view of a control system constructed in accordance with my invention. The system is shown in an energized condition.

Referring to the drawing, I have shown a synchronous dynamoelectric machine 10 having an inductive field winding 11 which is arranged to be energized through supply lines 12 and 13 from a suitable source of unidirectional current. To this end, one terminal of winding 11 is connected through a conductor 15 to the line 12, whereas the other terminal of the winding is connected through a conductor 16 to the opposite line 13. To perform certain protective functions, it is desirable to provide a circuit breaker such as 17 which may be opened in response to any predetermined condition to disconnect the conductors 15 and 16 and winding 11 from supply lines 12 and 13. Normally, however, a field switch, rather than the circuit breaker 17, is relied upon for this disconnecting function. As a result, under normal conditions, the circuit breaker 17 is closed and will remain closed. Such a field switch is schematically shown at 18 in the drawing.

The field switch 18 comprises interrupting contacts 18a and 18b suitably biased toward open-position and connected in lines 15 and 16, respectively. For moving these contacts to the closed position shown in the drawing, the switch 18 has an operating coil 20 which is connected across the lines 15 and 16 by an energizing circuit 21. This circuit 21 is under the control of a field control relay 22 having normally-open contact 22a connected therein. The operating coil 22b of the field control relay may be energized in response to any suitable predetermined condition. When this coil 22b is energized, it operates the control contacts 22a to the closed position shown in the drawing and thereby completes the energizing circuit 21 for the operating coil 20 of the field switch 18. Energization of coil 20 closes the interrupting contacts 18a and 18b and, thus, permits the winding 11 to be energized over the lines 15 and 16. It is in this condition that the control system is shown in the drawing.

Because the field winding 11 is highly inductive, there is a tendency for a very high voltage to be built up therein when its energizing circuit 15, 16 is interrupted. To safeguard the insulation of the winding from such high voltages, it is customary to provide the winding with a discharge circuit 25, which circuit preferably contains a discharge impedance, such as resistor 26. During normal excitation of the winding 11, the discharge circuit is maintained inoperative by a set of discharge contacts 27 provided on the field switch 18. More specifically, these discharge contacts 27 are arranged to open when the interrupting contacts 18a and 18b are moved into closed position, so that under normal excitation conditions, the contacts 27 are open and the discharge circuit 25 is maintained inoperative. However, when the winding 11 is disconnected from its source of excitation, as by the opening of contacts 18a and 18b, the discharge contacts 27 are moved into closed position thereby to render the discharge circuit 25 operative to dissipate the energy stored in the highly inductive field winding 11.

More specifically, this discharge operation takes place as follows: First, assume that contacts 18a and 18b are closed, and current flows in the direction of the dotted arrow 28 from the source of excitation, through contacts 18a, conductor 15, to the winding 11, and returns to the source through conductor 16 and contacts 18b. During this normal excitation, current is prevented from flowing through the discharge circuit 25 by the then-open contacts 27 and by a unidirectional conducting device 29 arranged to block current from the excitation source. This unidirectional conducting device 29, which preferably takes the form of a half-wave rectifier, is connected in series with resistor 26 and in shunt with discharge contacts 27. The relationship of this device 29 to the other components of the system is an important feature of my invention which will become more apparent hereinafter. Now when contacts 18a and 18b are opened to disconnect the winding 11 from its excitation source, the polarity of the winding 11 immediately reverses. As a result the winding 11 immediately begins to discharge itself in the direction of the solid arrow 30 through the discharge circuit 25, which had been rendered operative by the closing of contacts 27 at the time contacts 18a and 18b opened.

It will be apparent from the above operation that if the discharge contacts 27 are arranged in overlapping relationship with respect to the interrupting contacts 18a and 18b, i. e., if the discharge contacts 27 are closed prior to the instant that the interrupting contacts 18a, 18b, are opened, then the discharge current may flow through resistor 26 and the contacts 27 at the instant contacts 18a and 18b are opened. Accordingly, under such circumstances, there would be no opportunity for a high voltage build-up within winding 11. This overlapping relationship of the contacts is alone sufficient to insure that the discharge circuit will be operative at the instant of disconnection of the winding from its source—providing that the disconnection is effected by means of the field switch 18. However, if this disconnection is effected by means other than the field switch, the overlapping relationship between the contacts is, in effect, destroyed. For example, if the circuit breaker 17 is opened while the circuit is in the condition shown in the drawing, the contacts 27 would not close until a short time after the breaker had opened. During this interval of time, it was possible, in prior arrangements, for the voltage within winding 11 to build up to a value which could cause serious damage to the insulation of the winding.

In accordance with my invention, however, I have constructed the discharge circuit in such a manner that it operates properly irrespective of whether the winding 11 is disconnected from its source by the field switch 18 or by some other means such as circuit breaker 17. For example, should the circuit breaker 17 be opened as described above, thte discharge circuit of my invention is operative at the instant the circuit breaker is opened. More specifically, the initial discharge current is free to flow through the rectifier 29 in the direction of arrow 30 even though the contacts 27 have had insufficient time to close. This, of course, prevents voltage build-up within the winding, as is desired. To insure that only the initial discharge current will flow through the rectifier 29, the discharge contacts 27 are arranged to be closed and thereby short circuit the rectifier within a short time after the circuit breaker 17 is opened. To this end, I have provided a control rectifier 31 which blocks the flow of discharge current through the energizing circuit 21 thereby to prevent the coil 20 from being energized by discharge current. As a result, opening of the circuit breaker 17 interrupts the only energizing circuit 15, 21, 16 for the coil of the field switch, thereby to immediately close the discharge contacts 27. Since the contacts 27 close within a very short time after the discharge of the winding 11 is initiated, it will be apparent that the discharge rectifier 29 will be required to carry current for only a very short time. Accordingly, the discharge rectifier 29 may advantageously be of a comparatively small and inexpensive construction. Another factor which makes it possible to provide the desired operation with only a small rectifier 29 is that the magnitude of the discharge current flowing through the rectifier 29 is effectively limited by the series-connected discharge resistor 26.

Although I have used a control rectifier 31 to insure rapid closing response of the discharge contacts 27, it will be apparent to those skilled in the art that other suitable means could be used instead of such a control rectifier. For example, the control rectifier 31 could be replaced by the contacts of a polarized relay having its coil suitably connected across conductors 15 and 16.

Another important advantage of my invention is that the need for an overlapping relationship between contacts 27 and contacts 18a and 18b has been obviated. This follows from the fact that the rectifier 29 provides a path for initial discharge current even though the discharge contacts 27 are delayed in closing until the expiration of a period of time after disconnection of the winding 11 from its excitation source. Eliminating the need for this overlapping relationship makes it possible to appreciably simplify the construction of the field switch 18.

Additionally, my arrangement is especially advantageous when used to discharge the winding of a small machine. For example, in small machines, it is permissible to discharge a winding such as 11 by completely short circuiting it, as by means of a discharge circuit such as 25 having resistor 26 omitted therefrom. Now, if contacts 18a and 18b are arranged in overlapping relationship with respect to contacts 27, it is not practicable to so discharge the winding 11 because when the contacts 27 would be closed prior to opening of contacts 18a and 18b, an undesirable short circuit path would be provided for excitation current from the supply lines 12 and 13. However, if the contacts do not overlap, the field switch 18 may be operated without any danger of establishing this undesirable short circuit path for the excitation current. Since, as previously explained, my invention makes it possible to eliminate the need for the overlapping relationship, I can therefore arrange the contacts so that they do not overlap, thus, permitting omission of the discharge resistor 26, where desired.

It is to be noted that the discharge circuit of my invention, when used with a synchronous motor, is capable of providing all of the previously described functions but yet does not interfere with the normal starting operation for such a motor. For example, when a synchronous motor is started, it is customary to short circuit its field winding, such as 11, through a resistor such as 26. The current induced in winding 11 under such conditions is an alternating current which should be permitted to flow in either direction through discharge circuit 25. Since the discharge contacts 27 would be in closed position during this starting operation, the discharge rectifier 29 would be short circuited and, thus, obviously would not interfere with the desired flow of alternating current through the discharge circuit 25. The particular control circuit (not shown) for effecting the desired opening and closing of the field switch 18 during synchronous motor operation may be of a conventional type and forms no part of the present invention.

While I have illustrated my invention as being applied to the D.-C. excited field winding of a synchronous machine, it will be apparent to those skilled in the art that certain features of my discharge circuit are equally applicable to any type of highly inductive D.-C. excited device. For example, my discharge circuit may be used to control the discharge of the winding of a direct current motor or of the winding of a reactor.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In combination, an inductive winding arranged to be energized from a unidirectional current source, a first switch operable to an open-circuit position to disconnect said winding from said source, a discharge resistor for said winding, a second switch having discharge contacts closable in response to opening operation of said first switch to connect said resistor in circuit with said winding whereby to permit said winding to discharge in a predetermined direction through said resistor, a unidirectional conducting device connected in shunt with said contacts and in series with said resistor, said device having its direction of conductivity the same as said predetermined direction of dscharge current flow through said resistor.

2. The combination of claim 1 in which said second switch is provided with interrupting contacts movable to an open-circuit position also for disconnecting said winding from said source, and means coupling said interrupting contacts to said discharge contacts and operable to open said interrupting contacts substantially concurrently with closing of said discharge contacts.

3. Protective equipment for a D.-C. excited inductive element which is arranged to discharge in a predetermined direction when disconnected from its excitation source comprising, the series combination of a discharge resistor and a unidirectional conducting device adapted to be connected in circuit with said element, said unidirectional conducting device having its direction of conductvity the same as said predetermined direction of discharge but in opposition to the direction of current flow from the excitation source, a switch having discharge contacts closable to shunt said unidirectional conducting device, and means for operating said switch to close its discharge contacts in response to disconnection of said element from its excitation source.

4. In combination with the D.-C. excited field winding of a synchronous motor which is arranged to discharge in a predetermined direction when disconnected from its excitation D.-C. source, the series combination of a discharge resistor and a unidirectional conducting device connected in series with said field winding, said unidirectional conducting device having its direction of conductivity the same as said predetermined direction of discharge but in opposition to the direction of current flow from the source of D.-C. excitation, a switch having discharge contacts closable to shunt said unidirectional conducting device whereby to permit alternating current to flow through said discharge resistor during starting of said synchronous motor, and means for operating said switch to close said discharge contacts in response to disconnection of said winding from its D.-C. excitation source.

5. In a protective arrangement for a D.-C. excited inductive element which is arranged to discharge in a predetermined direction when disconnected from its excitation source, a discharge circuit for said inductive element operable when connected across said element to short circuit said element, a field switch having interrupting contacts movable to an open position to disconnect said element from its excitation source and discharge contacts movable to a closed position to connect said discharge circuit across said element, means coupling said interrupting and discharge contacts together and operable to open said interrupting contacts before said discharge contacts are closed, a unidirectional conducting device connected in said discharge circuit and in shunt with said discharge contacts, said device having its direction of conductivity the same as said predetermined direction of discharge but in opposition to the direction of current flow from the excitation source, and means responsive to disconnection of said inductive element from its excitation source for operating said field switch to close its discharge contacts.

6. In a protective arrangement for a D.-C. excited inductive element which is arranged to discharge in a predetermined direction when disconnected from its excitation source, a discharge circuit for said element, a field switch having interrupting contacts movable to an open position to disconnect said element from its excitation source and discharge contacts movable to a closed position to connect said discharge circuit in circuit with said element, means coupling said interrupting and discharge contacts together and operable to close said discharge contacts substantially concurrently with the opening of said interrupting contacts, a unidirectional conducting device connected in said discharge circuit and in shunt with said discharge contacts, said device having its direction of conductivity the same as said predetermined direction of discharge but in opposition to the direction of current flow from said excitation source, and means responsive to disconnection of said inductive element from its excitation source for operating said field switch to close its discharge contacts.

References Cited in the file of this patent

UNITED STATES PATENTS

| 1,966,077 | Nyman | July 10, 1934 |
| 2,673,947 | Winther | Mar. 30, 1954 |

FOREIGN PATENTS

| 511,702 | Great Britain | Aug. 23, 1939 |